Jan. 7, 1958 H. SCHACHET 2,818,897
CRISS-CROSS VEGETABLE SLICING MACHINE
Filed Dec. 8, 1954 3 Sheets-Sheet 1

INVENTOR.
H. Schachet
BY Hyman Schachet
ATTORNEY

Jan. 7, 1958 H. SCHACHET 2,818,897
CRISS-CROSS VEGETABLE SLICING MACHINE
Filed Dec. 8, 1954 3 Sheets-Sheet 2

INVENTOR.
H. Schachet
BY Hyman Schachet

ATTORNEY

Jan. 7, 1958     H. SCHACHET     2,818,897
CRISS-CROSS VEGETABLE SLICING MACHINE
Filed Dec. 8, 1954     3 Sheets-Sheet 3

INVENTOR.
H. Schachet
BY Hyman Schachet
ATTORNEY

United States Patent Office 2,818,897
Patented Jan. 7, 1958

2,818,897

CRISS-CROSS VEGETABLE SLICING MACHINE

Hyman Schachet, Denver, Colo.

Application December 8, 1954, Serial No. 473,933

1 Claim. (Cl. 146—78)

The invention relates to improvements in criss-cross vegetable slicing machines, the object of which is to provide; first for continuous criss-cross slicing with increased capacity without turning and/or moving the vegetable holding cones by hand or automatically after each cut which is necessary on many conventional machines, thereby retarding production; secondly for a machine which will cut all sizes of vegetables in criss-cross style.

On the accompanying drawing to which reference will now be had one embodiment of the invention has been illustrated. Referring to the drawing:

Figure 8 is a fragmentary edge view of the disks looking upwardly through plane 8—8 Figure 2; and, Figures 9 to 16, inclusive, show the relative consecutive positions of the two slicing disks through a complete cycle.

Figure 1:
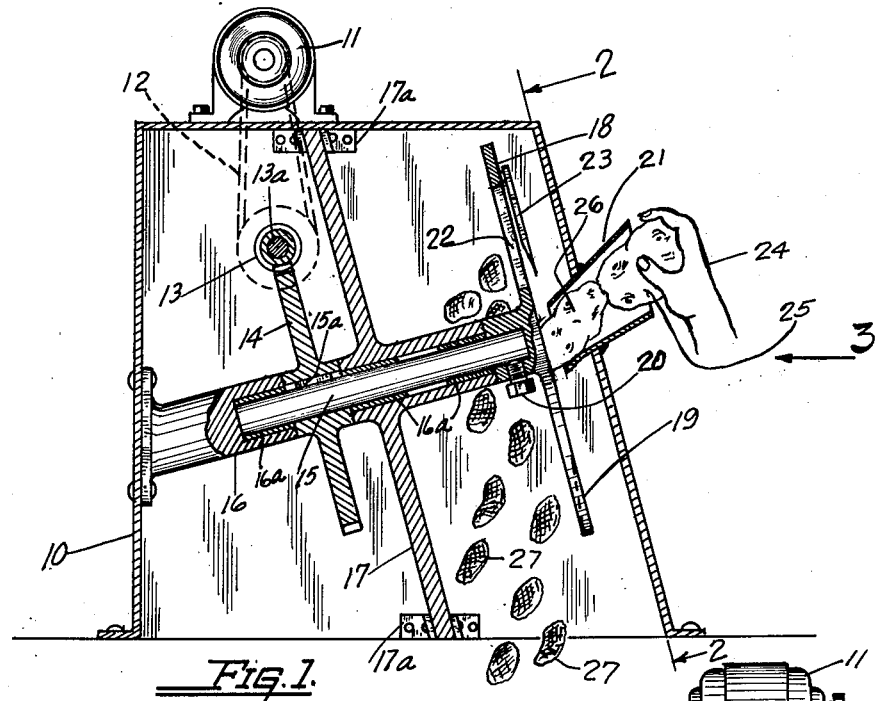
Figure 1 is a vertical section through Figure 2.

Referring now to the drawings. Reference numeral 10 designates a housing on the top of which is supported a motor 11 that drives the worm 13 by means of a belt 12. The worm shaft 13a is journaled in bearings 13b, 13c and 13d. Worm 13 is positioned in operative engagement with spur gear 14 that is keyed to shaft 15 by a key or spline 15a. The inner end of shaft 15 is journaled in bearing 16 which is attached to the rear wall of the housing, as shown in Figure 1. As illustrated on the drawings, there are two identical shafts 15 supported as shown in Figure 1, each carrying a spur gear 14 (see Figure 2).

During the following description, except where it becomes necessary to distinguish specifically, the description of the shafts and bearings will be limited to the one shown in Figure 1. A shaft bearing support 17 is attached to the ends of the housing by brackets 17a and has an elongated bearing for each shaft 15. Attached to the outer ends of shafts 15 are slicing disks 18 and 19 which have also been identified by letters R and L and which may, therefore, occasionally be referred to as slicing disks L and R respectively. The principal novelty of this invention resides in the construction and interrelation of the slicing disks, which will presently be described in detail.

Figure 2:
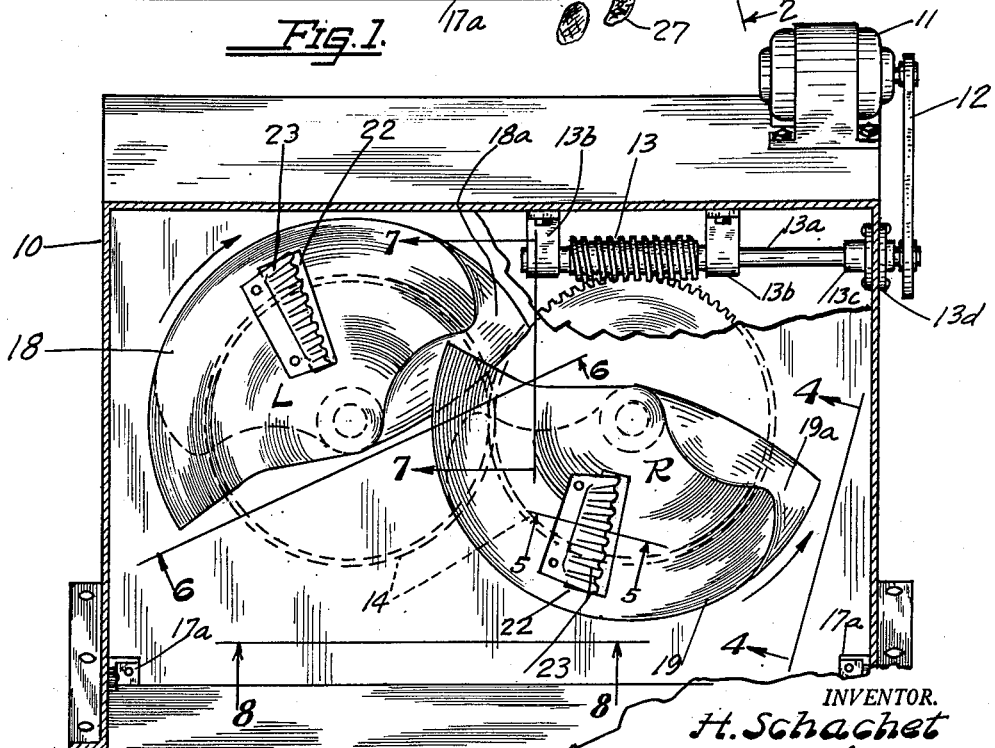
Figure 2 is a front elevational view looking through plane 2—2, Figure 1.
Figure 3:
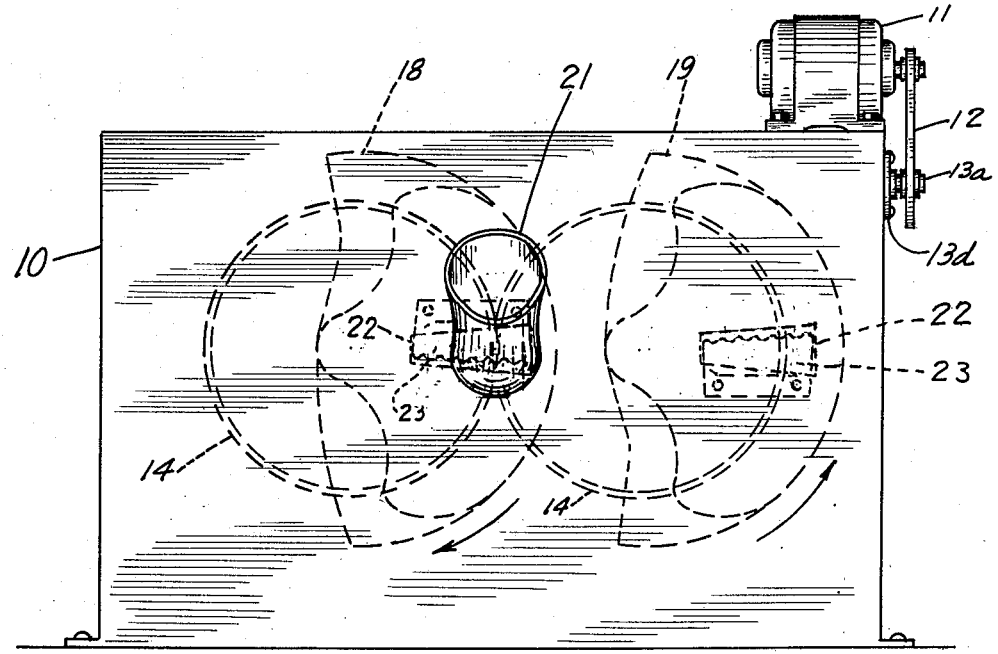
Figure 3 is a front elevational view looking in the direction of arrow 3 in Figure 2.
Figure 4:
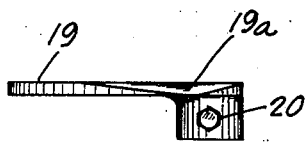
Figure 4 is an edge view of one of the slicing disks looking through plane 4—4 Figure 2.
Figure 7:
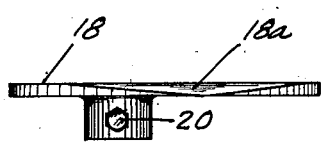
Figure 7 is an edge view of the disk shown in Figure 6, but looking through plane 7—7 Figure 2.
Figure 6:
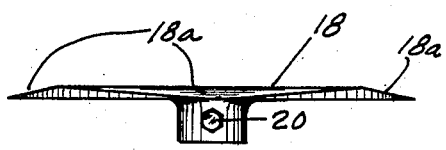
Figure 6 is an edge view of one of the slicing disks looking through plane 6—6 Figure 2.
Figure 5:
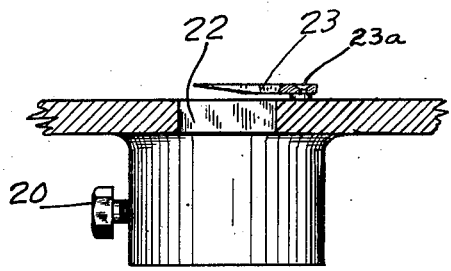
Figure 5 is an enlarged section taken on line 5—5 Figure 2.
Figure 9:
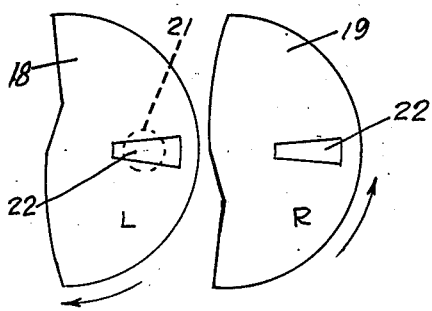
Figure 10:
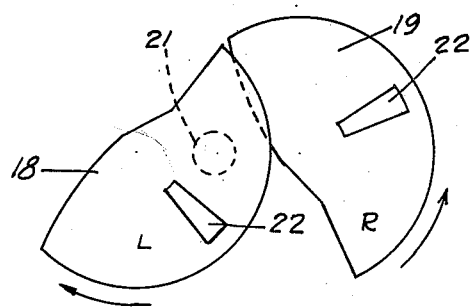
Figure 11:
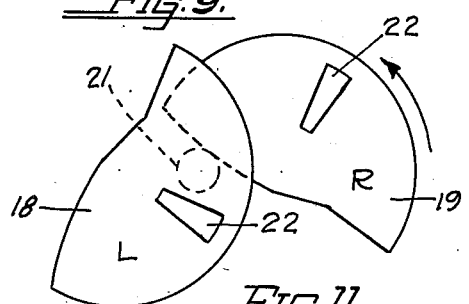
Figure 12:
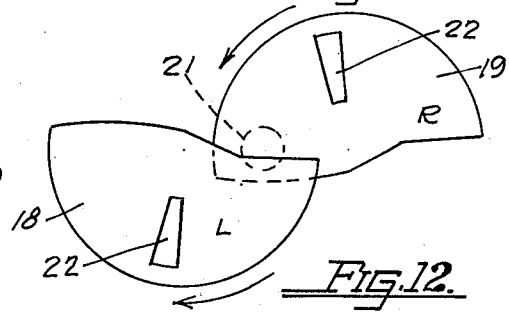
Figure 13:
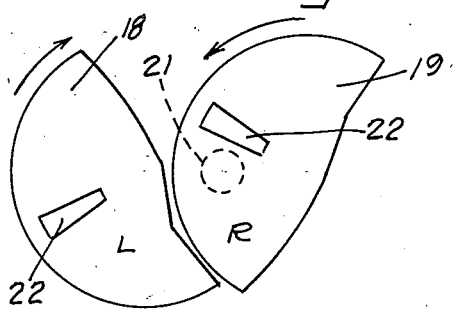
Figure 14:
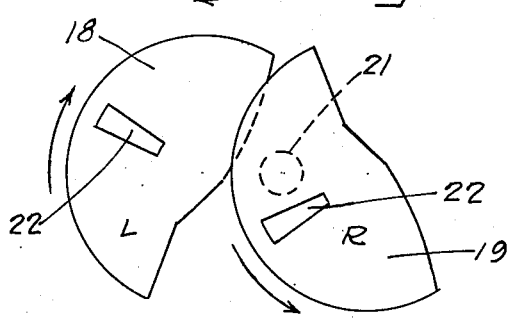
Figure 15:
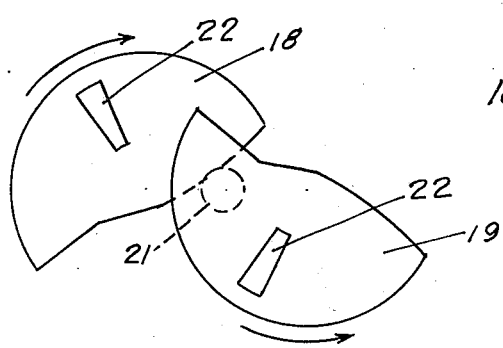
Figure 16:
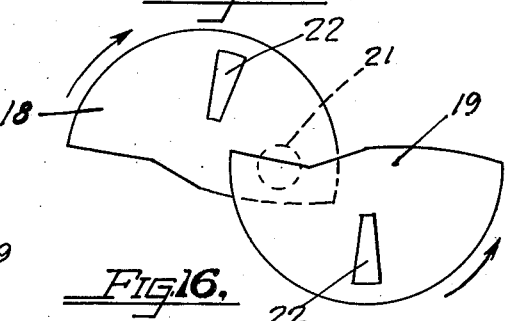

It will be seen from Figure 1 that the slicing disks are attached to the shafts by set screws 20 or other equivalent means that permit them to be readily removed, replaced and adjusted. It will be seen from Figures 2 and 3 as well as from many of the other figures that the slicing disks at times during their cyclic rotation have adjacent edges in overlapping position. At this point reference will be had to Figures 1 and 3 which show a tubular feeding cone 21 whose inner end terminates adjacent the outer surfaces of the slicing disks. It is desirable that the outer faces of the two slicing disks shall lie in the same plane and also that they shall lap each other so as to provide a support in every position for the potato or other vegetable 26 that is to be sliced. The leading edges of both slicing disks have peculiarly shaped outwardly tapering beveled surfaces 18a and 19a and the following edges have similarly shaped beveled surfaces on their under sides; these have been outlined by broken lines in Figure 2. The shape of the disks has been shown in considerable detail in Figures 4 to 8, and further detailed description is not believed to be necessary, especially in view of Figures 9 to 16. Since the purpose of the machine is to slice vegetables the disks are provided with slicing knives of more or less conventional design. Each disk has been shown as provided with a trapezoidal opening 22 to which a slicing knife 23 of the type that cuts a corrugated surface, as indicated by the wavy lines in Figure 2, is attached by means similar to that shown in Figure 5, and more clearly shown in U. S. patent to Goodman, Jr., No. 2,024,353. However, applicant desires to use the specific kind and arrangement of slicing knives that he considers most suitable for his purpose. Attention is called to Figures 2 and 3 which show that each disk comprises a segment of a circle that subtends an arc of substantially 180 degrees and will, for convenience in describing, be referred to as substantially semi-circular.

I claim:

A vegetable slicing machine comprising: drive means, a drive shaft operatively connected to the drive means for rotational movement, a driven shaft mounted in spaced parallel relation to the drive shaft, gear means interconnecting the drive and driven shafts to effect rotation thereof in opposite directions, two substantially semicircular disks each having a radius greater than one-half the distance between the drive and driven shafts mounted thereon for rotational movement, each disk including a radial slot and a cutting blade mounted adjacent said slot, each disk having at least one planar face, the planar faces of both disks lying on the same side thereof and being arranged in coplanar relation, portions of both faces along the edge of both disks being cut away to form means whereby said portions may overlap while maintaining the coplanar relation of the planar faces, said portions of said disks overlapping one another to form a metal support in all rotarial positions thereof except when a blade moves between the axes of rotation.

References Cited in the file of this patent

UNITED STATES PATENTS

| | | |
|---|---|---|
| 2,024,353 | Goodman | Dec. 17, 1935 |
| 2,567,248 | Stahmer | Sept. 11, 1951 |

FOREIGN PATENTS

| | | |
|---|---|---|
| 363,752 | Great Britain | Dec. 31, 1931 |
| 410,926 | Great Britain | May 31, 1934 |